March 2, 1948.   P. H. ODESSEY   2,436,822
STABILIZER FOR ALTERNATING-CURRENT LINE REGULATORS
Filed Feb. 10, 1945
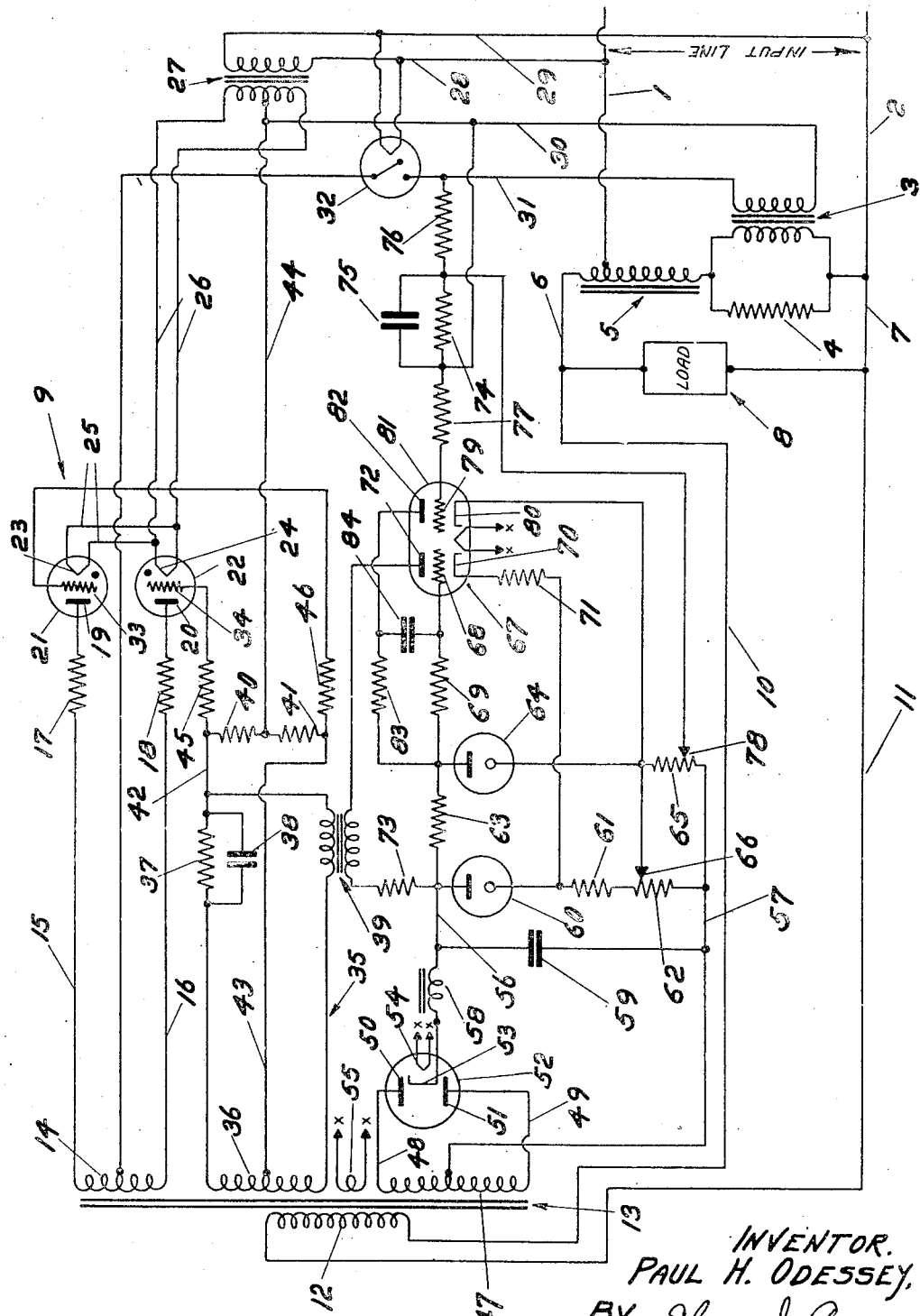
INVENTOR.
PAUL H. ODESSEY,
BY Elmer J. Gorn
ATTY.

Patented Mar. 2, 1948

2,436,822

UNITED STATES PATENT OFFICE 2,436,822

STABILIZER FOR ALTERNATING-CURRENT LINE REGULATORS

Paul H. Odessey, Great Neck, N. Y., assignor to Raytheon Manufacturing Company, Newton, Mass., a corporation of Delaware Application February 10, 1945, Serial No. 577,273

7 Claims. (Cl. 323—89)

My present invention relates to A.-C. line regulating systems which include D.-C. operated control means for maintaining substantially constant A.-C. output voltage, and more particularly to means for stabilizing the operation of such control means.

It is known, in regulating an A.-C. line, to connect an impedance, for example, a saturable reactor, in series with the primary of a transformer across the secondary of which a load is connected, and vary the magnetic saturation of said reactor with a D.-C. whose magnitude is a function of the magnitude of the A.-C. output voltage delivered to the load. In so doing, the impedance of the transformer input is so varied as to counteract any tendency toward fluctuation in the line voltage. I have found, however, that such systems have an appreciable inherent time-constant, which interferes with their sensitivity and stability, and causes hunting.

It is, therefore, the main object of my present invention to eliminate the disadvantages referred to, and in so doing, provide a sensitive and stable circuit, which is free of hunting, for controlling an A.-C. line regulator of the general character described.

It is a further object of my present invention to provide a circuit, having the foregoing highly desirable characteristics, which is simple, which is composed of standard parts, and in which the chances of over-voltage conditions, due to failure of any of the components, are maintained at a minimum.

These and other objects and advantages of my present invention, which will become apparent as the detailed description thereof progresses, are attained in the following manner:

A portion of the A.-C. output which is applied to the load is rectified, and the resulting D.-C. is compared with a reference potential established in the system in order to derive a variable D.-C. proportional to the difference therebetween. The variable difference D.-C. thus obtained is utilized to adjust the magnitude of a control D.-C. intended to be applied to the line-regulating element which, as stated, may be a saturable reactor. By way of example, the control D.-C. may be obtained by rectifying another portion of the A.-C. output of the system, or it may be obtained by rectifying a separately regulated A.-C. source. Also by way of example, the magnitude of the control D.-C. may be adjusted by altering the phase of another portion of the A.-C. output of the system as a function of the fluctuation thereof, and utilizing the resulting phase-shifted output to operate the control D.-C. generator. Other means for adjusting the magnitude of the control D.-C. will readily suggest themselves.

In order to eliminate hunting, a portion of the control D.-C. is applied, preferably, as negative feedback, to the variable difference D.-C. generator so as to oppose and thereby dampen any tendency to sudden changes in the input to said generator.

By these expedients, the disadvantages of known A.-C. regulating systems, to which reference has been made, are eliminated, and a simple system is presented which is sensitive and stable, and therefore affords good regulation.

In the accompanying specification I shall describe, and in the annexed drawing show, an illustrative embodiment of the regulating system of my present invention. It is, however, to be clearly understood that I do not wish to be limited to the exact details herein shown and described for purposes of illustration only, inasmuch as changes therein may be made without the exercise of invention and within the true spirit and scope of the claims hereto appended.

In said drawing, the single figure is a schematic diagram of an A.-C. line regulating system assembled in accordance with the principles of my present invention.

Referring now more in detail to the aforesaid illustrative embodiment of my present invention, and with particular reference to the drawing, the numerals 1 and 2 designate the conductors of an A.-C. line which it is desired to regulate for the purpose of maintaining substantially constant output voltage.

Connected across the line, with a saturable reactor 3 shunted by a resistor 4 in series therewith, is the primary of a transformer 5, preferably, an autotransformer, the secondary of said transformer being connected by conductors 6 and 7 to a load 8.

Inasmuch as the impedance of the input circuit to the transformer 5 is an inverse function of the magnetic saturation of the saturable reactor 3, it is obvious that the application of a control D.-C. to said saturable reactor can be utilized to maintain the A.-C. output across the transformer secondary substantially at a constant level.

For this purpose, said saturable reactor 3 is connected to a source 9 of control D.-C. which is responsive to fluctuations in the magnitude of the A.-C. output voltage, a rise in said output voltage reducing the control current to the saturable reactor and thereby increasing the impedance of the transformer input circuit, and vice versa.

While not limited thereto, I prefer that the source 9 of control D.-C. consist of a rectified portion of the A.-C. output of the system. For example, there may be connected across the load 8. by means of conductors 10 and 11, the primary 12 of a plate and filament transformer 13, said transformer including a secondary winding 14 to the opposite terminals of which are connected, through conductors 15 and 16 and dropping resistors 17 and 18, the anodes 19 and 20 of a pair of grid-controlled gas discharge tubes 21 and 22, known as thyratrons. Said tubes include filaments 23 and 24 which may be heated by current conveyed thereto through parallel pairs of conductors 25 and 26 connected across the secondary of a filament transformer 27 the primary of which is connected by conductors 28 and 29 across the A.-C. line to be regulated. The filaments of the thyratrons may be connected, through a center-tap on the secondary of the transformer 27 and a conductor 30, to one input terminal of the saturable reactor 3, and the anodes of said thyratrons may be connected, through a center-tap on the secondary winding 14 of the transformer 12 and a conductor 31, to the remaining input terminal of said saturable reactor, whereby, upon exercising appropriate control over the grid potentials of said thyratrons, full-wave rectification of a portion of the A.-C. output of the system is obtained. If desired, the input circuit to the saturable reactor may include an "Edison" time delay 32, whereby, when the system is first put into operation, no plate potential is applied to the thyratrons until the filaments thereof become appropriately heated.

The magnitude of the D.-C. output of the thyratrons 21 and 22 can be adjusted in a number of ways, but I prefer to accomplish this by controlling the phase relationship between the input to the anodes 19 and 20 and the input to the grids 33 and 34. For this purpose, I provide a phase-shifting network 35 which includes, in series, another secondary winding 36 on the transformer 13, a parallel combination of a resistor 37 and capacitor 38, and another saturable reactor 39, the output of this network being taken across a voltage divider consisting of resistors 40 and 41 connected by a conductor 42 to one output terminal, and by a conductor 43 to a center-tap on the secondary winding 36, the latter constituting the other output terminal. The junction of the resistors 40 and 41 is connected by a conductor 44 to the center-tap on the secondary of the filament transformer 27, and therethrough, to the filaments 23 and 24 of the thyratrons 21 and 22. The grids 33 and 34 of said thyratrons are connected, respectively through current-limiting resistors 45 and 46, to the outer terminals of the resistors 40 and 41, whereby the output of the phase-shifting network 35 is differentially applied to said thyratrons.

The phase of the output of the network 35 may be adjusted with respect to the anode input to the rectifying thyratrons by altering the impedance of said network, and this may be accomplished by applying a variable D.-C. to the saturable reactor 39. Such a D.-C. should, of course, vary in magnitude as a function of the magnitude of the A.-C. output of the system, and I derive such a D.-C. in the following manner:

The transformer 13 may include another secondary winding 47 the outer terminals of which are connected by conductors 48 and 49 to the anodes 50 and 51 of a full-wave rectifier tube 52, said tube including an indirectly heated cathode 53 and a heating filament 54. The latter may be connected, as indicated, to still another secondary winding 55 on the transformer 13. The rectified output is obtained across conductors 56 and 57, respectively connected to the cathode 53 and a center-tap on the secondary winding 47, said output being filtered by a series choke 58 and a shunting capacitor 59. A choke-input filter, such as is shown in the drawing, results in regulation in accordance with the average value of the A.-C. output of the system; but if regulation in accordance with the peak value of said output is desired, a capacitor-input filter should be utilized.

In any event, the D.-C. thus obtained is employed to control the magnitude of the phase shift introduced by the network 35. I prefer, however, that said D.-C. not be directly fed to the impedance-control element of said network, but instead, that said D.-C. be compared with a reference potential established in the system in order to derive a variable difference D.-C. which, in turn, be applied to the phase-shifting network. I thereby attain smoother and more stable control.

For this purpose, I connect across the rectified output just described a conventional voltage-regulating gas discharge tube 60, and a current-limiting resistor 61 and potentiometer 62 in series therewith. The tube 60 constitutes an automatically variable impedance and therefore, the drop across the same remains constant regardless of fluctuations in the input thereto, thus establishing a reference potential in the system.

I also connect across the aforementioned rectified output, in shunt with the circuit including the gas-discharge tube 60, a fixed impedance in the form of a resistor 63, in series with a second gas discharge tube 64 and a potentiometer 65, the junction of said potentiometer and said tube being connected to the adjustable arm 66 of the potentiometer 62 for a purpose later to be described. It will be noted that variations in the input to the tube 64 result in variations in the drop across the resistor 63, and hence I have provided, at the junction of said resistor 63 and the gas discharge tube 64, a variable potential for comparison with the reference potential provided by the fixed drop across the gas discharge tube 60. The difference between these potentials is obtained between the junction of the resistor 63 and tube 64, and the junction of the resistor 61 and tube 60. The variable difference D.-C. thus obtained is applied to a D.-C. amplifier 67, the grid 68 of which is connected, through an input grid resistor 69, to the above-mentioned junction between the resistor 63 and tube 64, and the indirectly heated cathode 70 of which is connected, through a resistor 71, to the above-mentioned junction between the resistor 61 and tube 60. The plate 72 of the amplifier 67 is connected to the positive lead 56 of the rectified output from the tube 52 through the saturable reactor 39 and a load resistor 73. The grid 68 of the amplifier 67 is maintained at an appropriate potential with respect to the cathode 70 of said tube by adjustment of the arm 66 of the potentiometer 62.

I thus obtain a variable difference D.-C. whose magnitude is proportional to any variations in the A.-C. output of the system, and by utilizing this D.-C. to vary the impedance of the saturable reactor 39, I control the magnitude of the phase-shift introduced by the network 35, and therefore, the magnitude of the D.-C. output of the thyratrons 21 and 22 which is applied to what may be termed the primary control element of the system, namely, the saturable reactor 3.

Now, I find that if the system is utilized as described up to this point, it has a tendency to hunt, and in order to eliminate this tendency, I prefer to proceed in the following manner:

A portion of the control D. C. which is fed to the saturable reactor 3 is applied across a network including a parallel combination of a resistor 74 and capacitor 75, and a series resistor 76. The time-constant of the combination of the resistor 74 and the capacitor 75 is long compared to the inherent time-constant of the system, and the voltage thereacross is applied, through a grid resistor 77 and the adjustable arm 78 of the potentiometer 65, between the grid 79 and cathode 80 of another D.-C. amplifier 81, appropriate bias on the amplifier 81 being obtained by adjusting the position of said arm 78. The plate 82 of the amplifier 81 is connected, through a load resistor 83, to the junction of the resistor 63 and gas discharge tube 64, the output across said load resistor being applied as negative feedback, through a coupling capacitor 84, to the input to the variable difference D.-C. amplifier 67. The magnitude of the feedback voltage is a function of the rate of change of the control D. C. fed to the saturable reactor 3, and thereby, there is obtained a tendency to oppose sudden changes in the magnitude of the A.-C. output of the system, eliminating hunting.

This completes the description of the aforesaid illustrative embodiment of the line-regulating system of my present invention, and the operation thereof may be briefly summarized as follows:

Assuming that the line voltage tends to rise, the result will be an increased rectified output between the conductors 56 and 57, and an increased difference between the variable potential at the junction of the resistor 63 and tube 64, and the fixed reference potential across the tube 60. More current, therefore, passes through the resistor 63, and a negative-going input voltage is applied to the D.-C. amplifier 67. Current through the saturable reactor 39 is reduced as a result; the impedance of the network 35 is increased; and the phase angle between the output of said network 35 and the anode input to the thyrathrons 21 and 22 is likewise increased. This results in a drop in the magnitude of the rectified output of said thyratrons, in other words, in the control D. C. applied to the saturable reactor 3. Therefore, the impedance across the conductors 1 and 2 is increased, and the tendency for the voltage induced in the secondary of the transformer 5 to rise is counteracted.

An initial drop in the line voltage reverses the direction of the tendencies described above in connection an initial increase in the line voltage.

It will thus be noted from all of the foregoing that I have thus provided a sensitive, simple, and efficient control circuit for stabilizing A.-C. line regulating systems, and rendering said systems free from hunting.

Other advantages of the systems of my present invention will readily occur to those skilled in the art to which the same relate.

What is claimed is:

1. In a circuit for stabilizing the operation of the control means of an A.-C. line regulating system, means for comparing the magnitude of the A.-C. output of said system with a reference potential established therein, and deriving therefrom a variable D. C. proportional to the difference therebetween, comprising: means for rectifying a portion of said A.-C. output; an automatically variable impedance, receptive of the output of said rectifying means, and presenting a constant voltage drop thereacross; a second automatically variable impedance in series with a fixed impedance, connected in shunt with said first automatically variable impedance, likewise receptive of the output of said rectifying means, and presenting a variable potential, at the junction of said series connection, in response to fluctuations in said A.-C. output; and an electronic discharge device having its input connected across the series network including said fixed impedance and said first automatically variable impedance, whereby the difference between said variable potential and said constant voltage drop is applied thereto and amplified thereby.

2. In a circuit for stabilizing the operation of the control means of an A.-C. line regulating system, means for comparing the magnitude of the A.-C. output of said system with a reference potential established therein, and deriving therefrom a variable D.-C. proportional to the difference therebetween, comprising: means for rectifying a portion of said A.-C. output; a gas discharge tube, receptive of the output of said rectifying means, and presenting a constant voltage drop thereacross; a second gas discharge tube in series with a fixed impedance, connected in shunt with said first gas discharge tube, likewise receptive of the output of said rectifying means, and presenting a variable potential, at the junction of said series connection, in response to fluctuations in said A.-C. output; and a vacuum tube having its input connected across the series network including said fixed impedance and said first gas discharge tube, whereby the difference between said variable potential and said constant voltage drop is applied thereto and amplified thereby.

3. In a circuit for stabilizing the operation of the control means of an A.-C. line regulating system, means for generating D. C. for application to said control means comprising: means for rectifying a portion of the A.-C. output of said system and applying the resulting D. C. to said control means; a phase-shifting network including a saturable reactor, receptive of another portion of said A.-C. output, for adjusting the phase of said other portion with respect to the input to said rectifying means; means for applying the output of said phase-shifting network to said rectifying means; and means for applying a D. C., variable as a function of the magnitude of any fluctuation in said A.-C. output, to said saturable reactor, whereby the impedance thereof is altered and the magnitude of the phase shift introduced by said network is thereby adjusted to control the D.-C. output of said rectifying means.

4. In a circuit for stabilizing the operation of the control means of an A.-C. line regulating system: means for rectifying a portion of the A.-C. output of said system; means for comparing the magnitude of the resulting D. C. with a reference potential established in the system and deriving therefrom a variable D. C. proportional to the difference therebetween; means for amplifying the variable difference D. C. thus obtained; means for rectifying another portion of the A.-C. output of said system and applying the output thereof to said control means; means, responsive to variations in said variable difference D. C. for controlling the magnitude of the D.-C. output of said second-named rectifying means; and means, receptive of a portion of said last named D.-C. output, for applying negative feed-back in said amplifying means, whereby the response of the latter to sudden change in the magnitude of the A.-C. output of the system is sufficiently damped to prevent said system from hunting.

5. In a circuit for stabilizing the operation of the control means of an A.-C. line regulating system: means for rectifying a portion of the A.-C. output of said system; means for comparing the magnitude of the resulting D. C. with a reference potential established in the system, and deriving therefrom a variable D. C. proportional to the difference therebetween; means for amplifying the variable difference D. C. thus obtained; means for rectifying another portion of the A.-C. output of said system and applying the output thereof to said control means; means, responsive to variations in said variable difference D. C., for controlling the magnitude of the D.-C. output of said second-named rectifying means; and means, including an R.-C. network having a time constant which is long compared with the inherent time constant of said system, receptive of a portion of said last-named D.-C. output, for applying negative feed-back to said amplifying means, whereby the response of the latter to sudden change in the magnitude of the A.-C. output of the system is sufficiently damped to prevent said system from hunting.

6. In a circuit for stabilizing the operation of the control means of an A.-C. line regulating system, means for comparing the magnitude of the A.-C. output of said system with a reference potential established therein, and deriving therefrom a variable D. C. proportional to the difference therebetween, comprising: means for producing a D. C. whose magnitude is proportional to that of said A.-C. output; means, receptive of said D. C., for establishing in said circuit a constant voltage drop; an automatically variable impedance in series with a fixed impedance, connected in shunt with said second-named means, likewise receptive of said D. C., and presenting a variable potential, at the junction of said series connection, in response to fluctuations in said A.-C. output; and means, connected across the series network including said fixed impedance and said second-named means, whereby the difference between said variable potential and said constant voltage drop is applied thereto and amplified thereby.

7. In a circuit for stabilizing the operation of the control means of an A.-C. line regulating system, means for comparing the magnitude of the A.-C. output of said system with a reference potential established therein, and deriving therefrom a variable D. C. proportional to the difference therebetween, comprising: means for producing a D. C. whose magnitude is proportional to that of said A.-C. output; an automatically variable impedance, receptive of said D. C., and presenting a constant voltage drop thereacross; a second automatically variable impedance in series with a fixed impedance, connected in shunt with said first automatically variable impedance, likewise receptive of said D. C., and presenting a variable potential, at the junction of said series connection, in response to fluctuations in said A.-C. output; and means connected across the series network including said fixed impedance and said first automatically variable impedance, whereby the difference between said variable potential and said constant voltage drop is applied thereto and amplified thereby.

PAUL H. ODESSEY.

REFERENCES CITED

The following references are of record in the file of this patent:

UNITED STATES PATENTS

| Number | Name | Date |
| --- | --- | --- |
| 2,039,044 | Wolfert | Apr. 28, 1936 |
| 1,997,657 | Schmutz | Apr. 16, 1935 |
| 2,005,892 | Gulliksen | June 25, 1935 |
| 2,138,732 | Craig | Nov. 29, 1938 |
| 2,031,509 | Seeley | Feb. 18, 1936 |